United States Patent [19]
Sullivan et al.

[11] Patent Number: 6,012,314
[45] Date of Patent: Jan. 11, 2000

[54] INDIVIDUAL MOTOR PIN MODULE

[75] Inventors: Edward Valentine Sullivan, Huntington Station; Edwin Gerard Haas, Sayville; Robert Charles Schwarz, Huntington; Martin Kesselman; Alexander N. Peck, both of Commack; John M. Papazian, Great Neck, all of N.Y.

[73] Assignee: Northrop Grumman Corporation, Los Angeles, Calif.

[21] Appl. No.: 08/903,476

[22] Filed: Jul. 30, 1997

[51] Int. Cl.$^7$ .................................................. B21D 22/00
[52] U.S. Cl. ............................................. 72/14.8; 72/413
[58] Field of Search .............................. 72/413, 414, 472, 72/478, 441, 446, 481.3, 481.5, 14.8

[56] References Cited

U.S. PATENT DOCUMENTS

| | | |
|---|---|---|
| 114,328 | 5/1871 | Nutter . |
| 419,074 | 1/1890 | Richards . |
| 1,141,640 | 6/1915 | Huguenin . |
| 1,595,916 | 8/1926 | Zetina et al. . |
| 1,826,783 | 10/1931 | Hess ........................................... 72/413 |
| 2,280,359 | 4/1942 | Trudell ....................................... 72/413 |
| 2,632,336 | 3/1953 | Luketa ....................................... 74/472 |
| 2,668,999 | 2/1954 | Baechler ................................... 25/121 |
| 3,188,077 | 6/1965 | Olson ........................................ 269/226 |
| 3,680,339 | 8/1972 | Hayakawa ................................. 72/441 |
| 3,698,265 | 10/1972 | Williams ............................. 74/665 GA |
| 3,946,492 | 3/1976 | DuBose, Jr. ........................... 33/169 R |
| 4,212,188 | 7/1980 | Pinson ....................................... 72/413 |
| 4,221,053 | 9/1980 | Bobel, II et al. ....................... 33/173 L |
| 4,241,509 | 12/1980 | Possati .................................. 33/174 PA |
| 4,398,693 | 8/1983 | Hahn et al. .............................. 249/155 |
| 4,400,884 | 8/1983 | Baresh et al. ........................ 33/174 PA |
| 4,412,799 | 11/1983 | Gates ........................................ 425/150 |
| 4,510,789 | 4/1985 | Tomioka ................................... 72/472 |
| 4,527,783 | 7/1985 | Collora et al. ............................ 269/21 |
| 4,684,113 | 8/1987 | Douglas et al. .......................... 269/21 |
| 4,691,905 | 9/1987 | Tamura et al. ............................ 269/45 |
| 5,163,793 | 11/1992 | Martinez ................................. 269/309 |
| 5,187,969 | 2/1993 | Morita ....................................... 72/413 |
| 5,192,560 | 3/1993 | Umetsu et al. ......................... 425/175 |
| 5,364,083 | 11/1994 | Ross et al. ................................ 269/21 |
| 5,470,590 | 11/1995 | Brubaker et al. ........................... 452/2 |
| 5,546,313 | 8/1996 | Masters .............................. 364/468.03 |
| 5,546,784 | 8/1996 | Haas ........................................... 72/413 |

FOREIGN PATENT DOCUMENTS 306031  12/1989  Japan .

*Primary Examiner*—Daniel C. Crane
*Attorney, Agent, or Firm*—Terry J. Anderson; Karl J. Hoch, Jr.

[57] ABSTRACT

The invention resides in a module used in conjunction with other such modules in an apparatus for rapidly producing an article having a three-dimensional design comprising a base, a plurality of pins mounted on said base and said plurality of pins movable relative thereto, a plurality of drive motors corresponding in number to the number of said plurality of pins and means interconnecting each of said plurality of pins with said base, each said means being connected independently between said base and a corresponding one of said pins. A control means interconnects each of said drive means and a controller with one another to effect selective energization of said drive means.

11 Claims, 2 Drawing Sheets

INDIVIDUAL MOTOR PIN MODULE

This application relates to U.S. application Ser. No. 08/921,823, entitled "MODULARIZED PARALLEL DRIVER TRAIN" filed Sep. 2, 1997, now U.S. Pat. No. 5,954,175 and to U.S. application Ser. No. 09/044,816, filed Mar. 20, 1996 and entitled "MODULARIZED ADJUSTABLE HOLDING FIXTURE".

BACKGROUND OF THE INVENTION

The present invention relates to a computer controlled tool capable of forming, for example, sheet material to provide rapid contour changes thereto, and relates more particularly to the mechanism by which such rapid contour changes are made wherein the mechanism is comprised of a plurality of assembled modules which act in concert with one another to effect the work operation.

It is desirable to provide tools, such as adjustable form dies, adjustable checking fixtures, adjustable contour fixtures, and adjustable inspection fixtures. Such tools have many applications in the aerospace industry and in other industries which need to hold, form, or inspect contoured components.

Large contour tools encounter problems in assembly, wiring, tolerance build-up, and servicing. Further, offline repairs, servicing, and maintenance are desirable features and if made possible, allow minimum down-time by rapidly replacing complete modules with acceptable spares in stock.

Additionally, the fabrication risks involved with machining tool bases and housings from solid material increases with the number of cells, bosses, and/or pockets required for motors, translating and/or rotating components. The amount of machining necessary for large tools can often be substantial. This causes tool costs to be very high due to the large expenditures required for buying or casting metal stock, then subsequently machining away the large volumes of metal needed assure proper fit of all assembled components. Thus, the concept of "modularity" is thus not provided for in such prior art machines, such as disclosed in U.S. Pat. No. 5,546,784. No "building block" approach is found, and thus no low-cost, high quality castings, forgings, or common machinings for component housings and/or bases are used in the prior art.

The use of traditional control systems for positioning a large array of individual motors require substantial amounts of wiring in very limited space. Large form tools traditionally have had a preset maximum active tool area (maximum usable length and width). The inflexible limiting nature of the plan form (length and width of the active area) is a problem which could be alleviated by using a modular system wherein only a foot print necessary to effect the job at hand need be fabricated. In addition, the cost for an adjustable tool is high relative to the cost for a single fixed-contour tool. The economic viability of replacing many fixed-contour tools by a single adjustable-contour tool depends upon the number of fixed tools that a single adjustable tool can replace.

Accordingly it is an object of the invention to provide an assembly wherein the overall initial system cost is lower and a major advantage when building large form tools.

Still a further object of the present invention is to provide a self-adjusting tool wherein individual-motor pin modules are used and provide building blocks when put together thereby lowering the overall cost of the tool and simplifying external wiring, assembly, and machining operations.

Yet still a further object of the invention is to provide an assembly with an inherently lower overall risk of fabrication breakage thereby reducing the magnitude of errors which can cause scrap when creating larger-scale tooling versus large one-piece housings.

Still a further object of the invention is to provide an assembly of the aforementioned type which provides easier servicing, component replacement, and less down time and provides such an assembly with quick-disconnect electrical plugs so that module replacement can be accomplished with minimum down time.

Further still an object of the invention is to provide an assembly of the aforementioned type which allows the plan form of an adjustable form tool to be changed inexpensively, rapidly to different length/width combinations by adding or subtracting modules to an oversize base plate.

Still an object of the invention is to provide an assembly of the aforementioned type which allows for offline repairs, servicing, and maintenance further allowing minimum down-time by rapidly replacing complete modules with acceptable spares in stock.

SUMMARY OF THE INVENTION

The invention resides in a module used in conjunction with other such modules in an apparatus for rapidly producing an article having a three-dimensional design and comprises a base, a plurality of pins mounted on said base and said plurality of pins being movable relative thereto. A plurality of drive motors corresponding in number to the number of said plurality of pins are provided and a means interconnects each of said plurality of pins with said base, each said means being connected independently between said base and a corresponding one of said pins. Control means interconnects each of said drive means and a controller with one another to effect selective energization and deenergization of said drive means associated with each of said drive motors.

Ideally the pins have planar sides and are prevented from rotating by the restraining action of the planar sides of said pins and said means for interconnecting each of said plurality of pins with said base, said drive means includes a lead screw, an encoder means and connected gear train each associated with one of said plurality of said pins.

Preferably the drive means includes an encoder means and connected gear train each associated with one pair of said plurality of said pins and said motors and said control means includes a subcontroller associated with said module and a main controller connectable to one or more subcontrollers through a bi-directional modified ring architecture and communication scheme more resembling a chain.

In the preferred embodiment, a plurality of modules are provided and each of said modules has an associated subcontroller connected to a main controller such that a module receives commands and data from a module connected closer to the main controller and/or transmits to the module which follows it and wherein each such subcontroller is initialized by causing each subcontroller to be initially configured to have an invalid address stored in local memory and causing the main controller to first transmit an initialize command with a desired starting address to the closest one of said subcontrollers and causing the closest subcontroller to accept this command as its address and to store it; and then causing said closest subcontroller to increment the address and transmit the incremented command to the next subcontroller in the ring/chain which repeats the process until the last subcontroller in the ring/chain transmits to the main controller, an address that is one larger than the total number of subcontrollers in the system. The last subcontroller transmits to the previous subcontroller which in turn transmits to the next previous subcontroller until the return message is received by the main controller.

Ideally the means for interconnecting each of said plurality of pins with said base includes a lead screw and each pin is defined by an elongated shank, with each pin having internal threads which are correspondingly sized and shaped to mate with a respective lead screw associated with the associated pin and each pin has a drive means and drive train and motor disposed in-line with each other.

DESCRIPTION OF THE PREFERRED EMBODIMENT

This describes an apparatus and a method of building large parallel translating-member devices by using a modularized building-block approach of adding or subtracting common modules containing a smaller quantity of individually-addressable motors.

Figure 1:
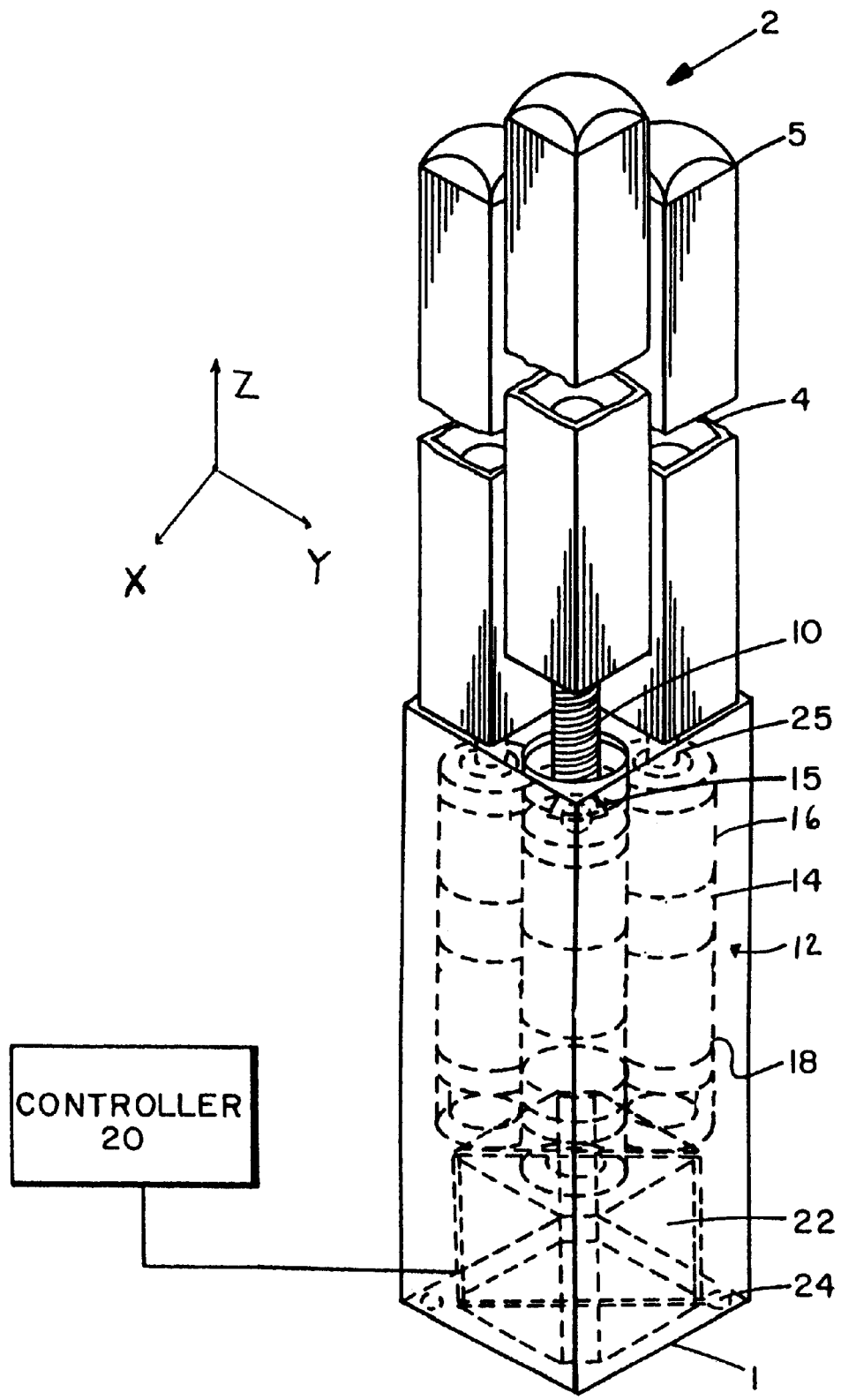
FIG. 1 is a perspective view of a module of the invention.

Referring to FIG. 1, an assembly 2 is shown embodying the invention. The pin module assembly 2 includes a plurality of pins 5 mounted for movement on a base 1. The base 1 is adapted for mounting to a plate at the bottom of a frame (not shown) in a manner which will become apparent later. Each pin 5 is defined by an elongated shank 4, with each pin 5 having internal threads which are correspondingly sized and shaped to mate with a respective lead screw 10 associated with the associated pin 5. The assembly is adapted to be inserted into a frame (not shown) of the type which is disclosed for example in U.S. Pat. No. 5,546,313. The pins 5 may be partly or fully threaded internally and may be made from bored solid block of metal stock, or alternatively, the pins 5 may be made from hollow tubes. In the case where the pins 5 are made from hollow tubes, threaded nuts or couplings are secured to the end of the pin shank 4 in lieu of formed internal threads.

The pins 5 are translated by the lead screws 10 in the indicated Z axis direction when the lead screws are rotated by drive motors 14. Rotation of the lead screws from the motors 14 is accomplished through the intermediary of a coupler means 12. Each motor 14 includes encoder means 18, and the coupler means 12 includes associated individually connected gear trains 16 each of which at respective input end thereof is rotated by a respective one of the individual motors 14 and each gear train has an output shaft 25 which is drivingly connected to a corresponding one of the lead screws 10. Each of the motors 14 is also connected to a controller 20 through a module subcontroller 22 which is responsible for driving each motor in either rotational direction or causing it to stop.

After the pin module assembly 2 is inserted into the completed form tool frame (not shown), the pins 5 are prevented from rotating by the restraining action of the planar sides of pins against the inside of the tooling frame. It is noted that the pins 5 can be square, rectangular or hexagonal in cross section, or semiround with machined flats or other antirotational provisions. The torque from each motor 14 therefore translates each pin a distance proportional to the amount of gear train output shaft rotation. The entire pin module assembly 2 is located via a locating means 24, e.g. locating pins depending from the base 1 which are received into openings in a mounting plate of the frame (not shown) for enclosing an array of pin module assemblies 2. In this way, the configuration of the tool can be changed rapidly to different length/width combinations by adding or subtracting module assemblies to the oversize base plate. The pitch of the lead screw 10 is chosen so that the pins 5 are self-locking when compressively loaded. Forming loads are transferred from the pin 5 to the lead screw 10 and then from the lead screw base 15 to the module base 1 via internal components.

As previously mentioned, each lead screw 10 is connected to an output shaft 25 of a gear train 16 which in turn receives motion from a motor 14 via the in-line gear train unit 16. The gear train 14 can use either planetary or non-planetary gears. These units are readily available commercially and can be connected directly to the motor 14 housing and motor output shaft. Each motor 14 is adapted to be run by D.C. power.

Figure 2:
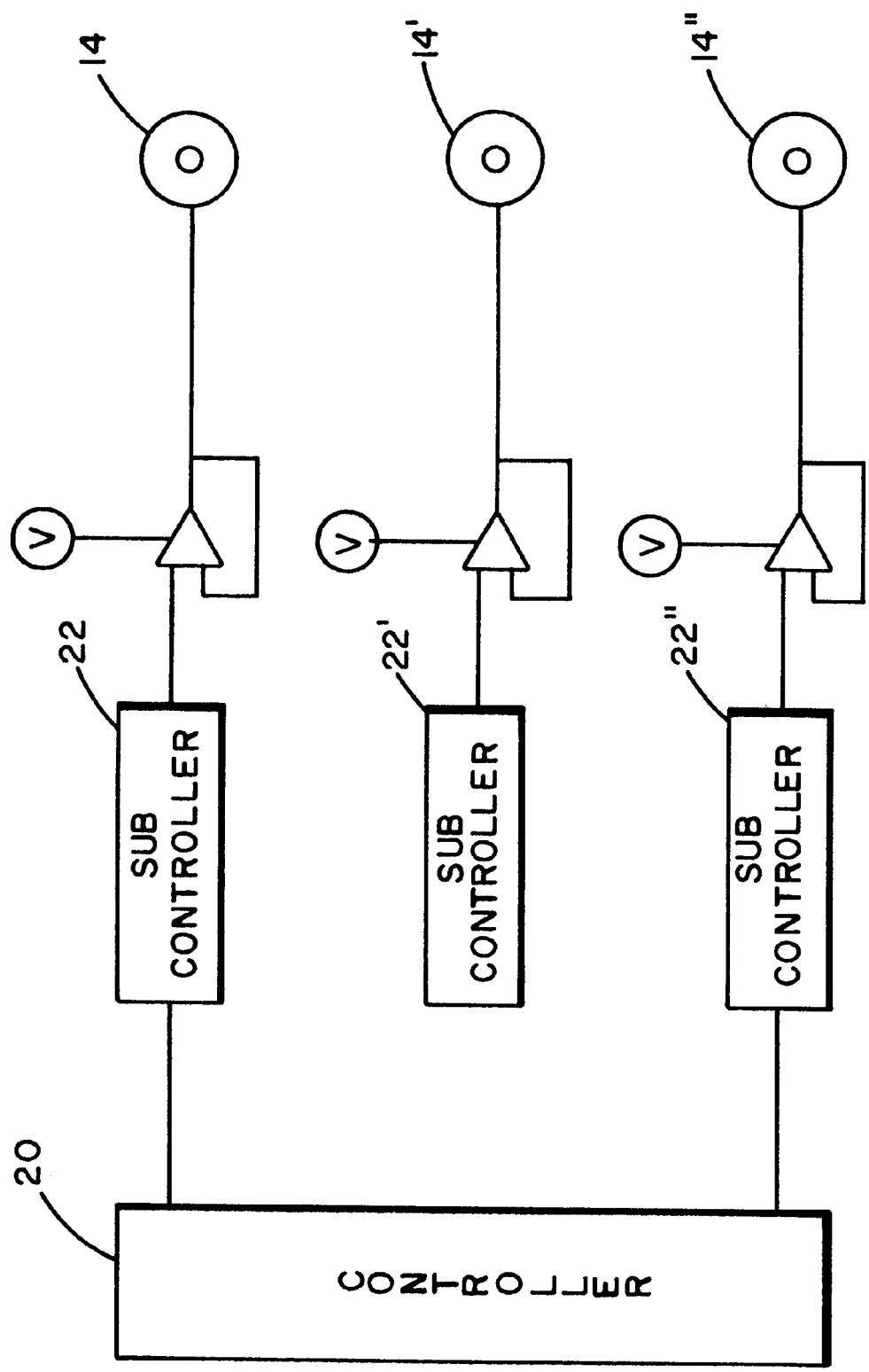
FIG. 2 is a schematic view of the control system.

Referring now to FIG. 2, it should be seen that a control system capable of controlling pin motion is provided and can be built with either centralized or distributed logic. The distributed logic approach is preferred when building large scale contour tools because the amount of external wiring is greatly reduced. The control system using the controller 20 determines how many revolutions (and portions of revolutions) a motor 14 must revolve and stores the correct number of encoder pulses in local memory in the subcontroller 22. As the motor 14 rotates, local circuitry in the subcontroller for that motor counts the number of pulses from the rotary encoder means 18. The number of pulsed feedback signals is compared to the target number of pulses stored in local memory for each motor 14, and the motor is stopped when the pulses counted are greater than or equal to the stored target number of pulses. In each assembly 2, each motor 14 and encoder assembly 18 is wired to a corresponding local subcontroller 22, and each local subcontroller to a neighboring circuit board. Each subcontroller also has an electrical power input source for driving the associated motor.

In practice, all module assemblies 2 are identical and interchangeable, yet each module can be individually addressed by the system controller. To accomplish this, the modules communicate using a novel bi-directional ring/chain architecture and communication scheme. In this architecture, a module receives commands and data from the module before it (closer to the system controller 20) and acts on and/or transmits to the module which follows it (further from the system controller 20). This provides an extensible mechanism by which any number of subcontrollers 22 can receive a command. For subcontrollers 22, 22', 22" . . . to recognize and act upon a command, it must have been initialized to a valid, unique address. Since all subcontroller modules are initially configured to have an invalid address stored in EEPROM (Electrically Erasable Programmable Read-Only Memory), the system controller first transmits an initialize command with the desired starting address, and the first subcontroller module 22 accepts this as its address and stores it. This subcontroller module 22 then increments the address and transmits it to the next subcontroller module 22' in the ring, which repeats the process. The last subcontroller module 22" in the ring transmits to the system controller 20 via all preceding subcontrollers, which receives the initialize command containing an address that is one larger than the total number of modules in the system. By this method, all modules are initialized with unique addresses, and the system controller is made aware of the exact number of modules and their addresses.

In summary, the use of individual-motor pin modules for building large assemblies further permits using distributed control system logic which helps alleviate the problem of handling large quantities of wires in limited space. When using distributed logic, control system circuitry is placed into each module and external wiring connections are reduced. Greater versatility can be achieved by allowing overall tool size changes inexpensively.

The overall plan form (length and width) dimensions can be changed when using the individual-motor pin module as building block units for form tools. Modules can easily be added or subtracted within the limitations allowed by the overall form tool base plate. Framing members (if used) around the entire assembly may have to be changed, but their cost would be low compared to replacement of an entire form tool for differing plan form (overall length and width) requirements. The use of the modular arrays allows for isolation and rapidly replacement of malfunctioning elements by replacing entire modules with spare modules. Further repairs can then be implemented off-line. This minimizes down time, and replacement cost. The ability to reconfigure an entire assembly of modules by adding or subtracting modules gives a high degree of versatility to the tool.

By the foregoing, an improved tool has been described by way of the preferred embodiment. However, numerous modifications and substitutions may be had without departing from the spirit of the invention. For example, the modules can be used to translate a series of sensors for rapidly digitizing the surface (or surfaces) of a contoured part or component. The digitized data can be directly stored in computer memory for a three-dimensional surface description which can be used by a computer-graphic or numerical control software application.

Accordingly, the invention has been described by way of illustration rather than limitation.

We claim:

1. An apparatus having a plurality of modules for rapidly producing an article having a three-dimensional design, said apparatus including a frame, said plurality of modules being mounted to said frame and each of said modules being comprised of:
   a base secured against movement to said frame;
   a plurality of pins mounted on said base and said plurality of pins movable relative thereto;
   a plurality of drive motors corresponding in number to the number of said plurality of pins;
   means interconnecting each of said plurality of pins with said base, each said means being connected independently between said base and a corresponding one of said pins; and
   control means interconnecting each of said drive means and a controller with one another to effect selective energization of said drive means and wherein said control means includes a subcontroller associated with one of said modules and a main controller connectable to one or more subcontrollers through a bi-directional ring/chain architecture and communication scheme.

2. The apparatus of claim 1 wherein said pins have planar sides and are prevented from rotating by the restraining action of the planar sides of said pins.

3. The apparatus of claim 2 wherein said means for interconnecting each of said plurality of pins with said base includes a lead screw, an encoder means and connected gear train each associated with one of said plurality of said pins.

4. The apparatus of claim 3 wherein said drive means includes an encoder means and connected gear train each associated with one pair of said plurality of said pins and said motors.

5. The apparatus of claim 4 wherein a plurality of modules are provided and each of said modules having an associated subcontroller connected to a main controller such that a module receives commands and data from a module connected closer to the main controller and acts on and/or transmits to the module which follows it.

6. The apparatus of claim 5 wherein said means for interconnecting each of said plurality of pins with said base includes a lead screw.

7. The apparatus of claim 6 wherein each pin is defined by an elongated shank, with each pin having internal threads which are correspondingly sized and shaped to mate with a respective lead screw associated with the associated pin.

8. The apparatus of claim 7 wherein each pin has a drive means and drive train and motor disposed in-line with each other.

9. The apparatus of claim 8 wherein each such subcontroller is initialized by causing each subcontroller to be initially configured to have an invalid address stored in local memory and causing the main controller to first transmit an initialize command with a desired starting address to the closest one of said subcontrollers and causing the closest subcontroller to accept this command as its address and to store it; and
   causing said closest subcontroller to increment the address and transmit the incremented command to the next subcontroller in the ring/chain which repeats the process until the last subcontroller in the ring/chain transmits to the main controller, an address that is one larger than the total number of subcontrollers in the system.

10. The apparatus of claim 9 wherein the last subcontroller in the ring/chain transmits to the main controller by communicating with the next closer subcontroller which then communicates with the next closest subcontroller until the address is received by the main controller.

11. An assembly having a plurality of modules wherein each module is used in conjunction with other such modules in an apparatus for rapidly producing an article having a three-dimensional design comprising:
   a base;
   a plurality of pins mounted on said base and said plurality of pins movable relative thereto;
   a plurality of drive motors corresponding in number to the number of said plurality of pins;
   means interconnecting each of said plurality of pins with said base, each said means being connected independently between said base and a corresponding one of said pins;
   control means interconnecting each of said drive means and a controller with one another to effect selective energization of said drive means;
   said pins having planar sides and are prevented from rotating by the restraining action of the planar sides of said pins;
   means for interconnecting each of said plurality of pins with said base includes a lead screw, an encoder means and connected gear train each associated with one of said plurality of said pins;
   said drive means includes an encoder means and connected gear train each associated with one pair of said plurality of said pins and said motors;
   said control means includes a subcontroller associated with each said module and a main controller connectable to one or more subcontrollers through a bi-directional ring/chain architecture and communication scheme;
   each of said plurality of modules being provided with an associated subcontroller connected to a main controller such that a module receives commands and data from a module connected closer to the main controller and acts on and/or transmits to the module which follows it.

* * * * *

UNITED STATES PATENT AND TRADEMARK OFFICE
CERTIFICATE OF CORRECTION

PATENT NO. : 6,012,314  
DATED : January 11, 2000  
INVENTOR(S) : Sullivan et al.

Page 1 of 1

It is certified that error appears in the above-identified patent and that said Letters Patent is hereby corrected as shown below:

Column 1,  
Line 9, add ahead of the section entitled "BACKGROUND OF THE INVENTION":

STATEMENT OF GOVERNMENT RIGHTS

-- This invention was made with Government Support under Cooperative Agreement N00014-95-2-003 awarded by the Office of Naval Research. The Government has certain rights in this invention. --

Signed and Sealed this

Thirtieth Day of October, 2001

Attest:

*Nicholas P. Godici*

NICHOLAS P. GODICI  
*Acting Director of the United States Patent and Trademark Office*

*Attesting Officer*